D. R. BRYAN.
PULLEY AND BELTING.
APPLICATION FILED NOV. 21, 1916.

1,290,894.

Patented Jan. 14, 1919.

Inventor
Daniel R. Bryan,
By his Attorney
Geo. H. Byrne

UNITED STATES PATENT OFFICE.

DANIEL R. BRYAN, OF CHATHAM, NEW JERSEY.

PULLEY AND BELTING.

1,290,894.  Specification of Letters Patent.  Patented Jan. 14, 1919.

Application filed November 21, 1916. Serial No. 132,519.

*To all whom it may concern:*

Be it known that I, DANIEL R. BRYAN, a citizen of the United States, and resident of Chatham, in the county of Morris and State of New Jersey, have invented certain new and useful Improvements in Pulleys and Belting, of which the following is a specification.

This invention relates to pulleys and belting, and has for its general object when in use to maintain the true alinement of the belt when traveling over the pulleys and to obviate any liability of the belt from buckling.

Another object of the invention is the provision of a cheap and efficient belting of an extreme width which is admirably adapted for use in connection with magnetic separators and which when worn through usage may be readily replaced for a comparatively small amount.

To these ends the invention consists in the novel details of construction and combination of parts more fully hereinafter disclosed and particularly pointed out in the claims.

Referring to the accompanying drawings forming a part of this specification, in which like numerals designate like parts in all of the views:—

Figure 1:
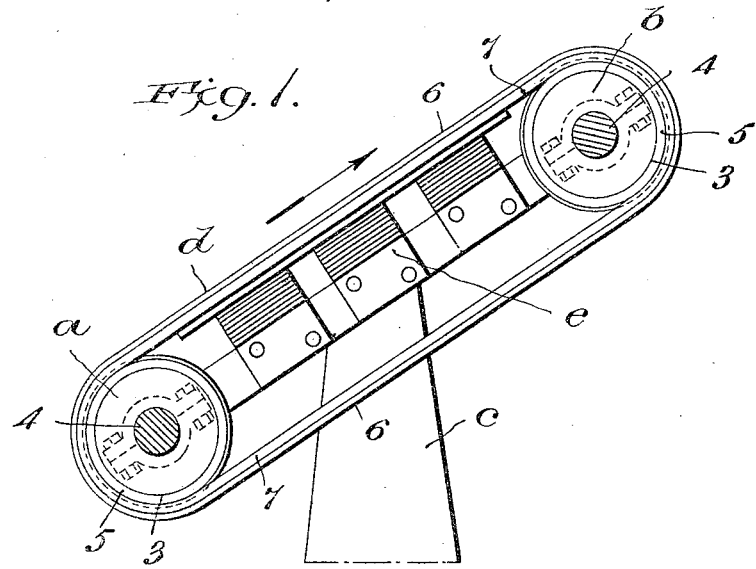
Figure 1 is a side elevational view of my invention shown in connection with a magnetic separator.

As is well known, in machines and apparatus where pulleys and a belting of relatively thin and wide proportions are desired, a great deal of trouble has been experienced by the buckling and the untrue running of the belting over the pulleys; this being due to the fact that no coöperative means between the pulleys and belting has been heretofore employed to obviate such difficulties. My invention, however, by the means now disclosed, completely obviates such difficulties as has been proved in actual use of devices of this kind.

Referring to the construction in detail—*a* and *b* designate a pair of pulleys journaled in the outer ends of a frame *c;* and *d* designates a belt traveling over the pulleys, and *e* designates a series of electro-magnets mounted on the frame and arranged between the pulleys and belting, as shown.

Each of the pulleys has its periphery 1 provided with a central crown portion 2, and has its end portions reduced as at 3. Shafts 4 pass through the pulleys and are journaled in bearings provided on the ends of the frame and one of these shafts, preferably the lower one, is adapted to be driven by any suitable motive power so as to drive the belt in the direction indicated by the arrow.

As indicated, the belt is arranged in a horizontally inclined plane so that non-magnetizable or extraneous particles deposited thereon will be operated upon by gravity to move from the lower end of the belt and magnetizable or metal particles are caused to adhere to the belt through the electro-magnets and be carried upwardly until they reach the point where they are acted on by gravity alone and fall from the upper end of the belt.

Bands of material 5, preferably formed of leather or the like, are securely mounted, in any suitable manner on the reduced end portions of the pulleys and these bands have their peripheries convexed so as to provide crowns.

Arranged to travel over the pulleys is the belt 6. This belt is preferably formed of a relatively thin material, such as cotton webbing so that the attractive force of the electro-magnets may be utilized to the best advantage possible.

A pair of reinforcing strips 7, preferably formed of leather, is mounted on the inner face of the belt, and these strips are secured to the opposite side edges of the belt, and are arranged to travel on the crowns 5 mounted on the end portions of the pulley.

Figure 2:
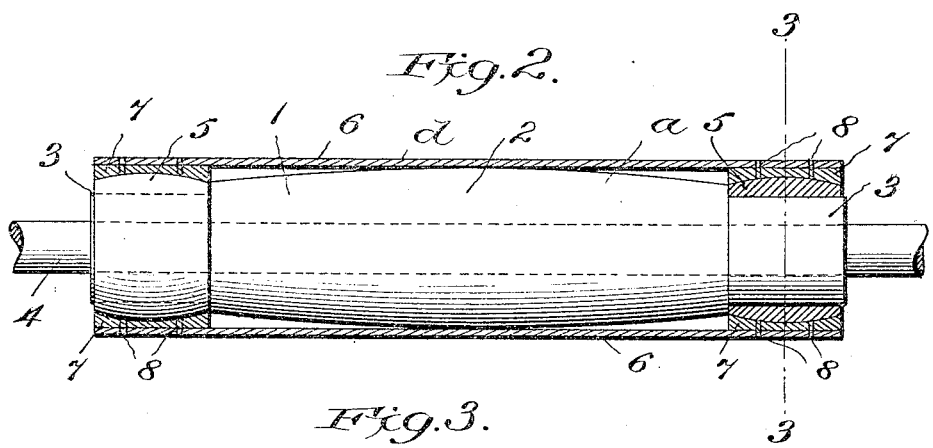
Fig. 2 is a view partly in section and partly in side elevation of a pulley and belting and Fig. 3 is a cross sectional view taken on the line 3—3 of Fig. 2.
Figure 3:

As shown in Fig. 2, when the reinforcing strips are traveling on the end crowns of the pulley, the central portion of the belt is in engagement with the central crown portion 2 of the pulley, and thus an even tension is exerted on the belt from the central portion outward, with the result that the belt always maintains a true alined position, and is stretched transversely from its direction of travel.

Any suitable means, such as a stitching 8, may be employed for securing the reinforcing strips to the inner face of the belt.

It is obvious that those skilled in the art may vary the details of construction and arrangement of parts, without departing from the spirit of my invention, and, therefore, I do not wish to be limited to such features, except as may be required by the claims.

What I claim is—

1. In combination; a pulley having its periphery provided with crowns at the central and end portions thereof, and a belting traveling over the pulley and having reinforcing strips mounted on its inner face for traveling over the crowns on the end portions of the pulley.

2. In combination; a pulley having its periphery provided with crowns at the central and end portions thereof, and a thin fabric belting traveling over the pulley and having reinforcing strips mounted on its inner face for traveling over the crowns on the end portions of the pulley.

3. In combination; a pulley having a crowned central portion and reduced end portions; bands of material mounted on said end portions and constituting crowns; a belting traveling over the pulley, and reinforcing strips mounted on the inner face of the belting for traveling over the crowns on the ends of the pulley.

4. In combination; a pulley having a crowned central portion and reduced end portions; bands of leather mounted on said end portions and constituting crowns; a belting traveling over the pulley, and reinforcing strips of material mounted on the inner face of the belting for traveling over the crowns on the ends of the pulley.

5. In combination; a pulley having a crowned central portion and reduced end portions; bands of leather mounted on said end portions and constituting crowns; a belting traveling over the pulley and formed of a thin fabric material and leather reinforcing strips mounted on the inner face of the belting for traveling over the crowns on the ends of the pulley.

Signed at Newark, in the county of Essex and State of New Jersey, this 17th day of November A. D. 1916.

DANIEL R. BRYAN.

Witnesses:
WILLIAM TRIES, Jr.,
CHARLES T. YOUNG.